United States Patent [19]

Zigler et al.

[11] Patent Number: 4,954,709
[45] Date of Patent: Sep. 4, 1990

[54] HIGH RESOLUTION DIRECTIONAL GAMMA RAY DETECTOR

[75] Inventors: Arie Zigler; Yosset Eisen; Yossef Eisen, all of Rishon Le Zion, Israel

[73] Assignee: Apti, Inc., Washington, D.C.

[21] Appl. No.: 394,331

[22] Filed: Aug. 16, 1989

[51] Int. Cl.$^5$ .............................. G01T 1/29; G01T 7/00
[52] U.S. Cl. .................... 250/385.1; 250/374; 250/389; 250/394
[58] Field of Search .................. 250/374, 385.1, 389, 250/394

[56] References Cited

U.S. PATENT DOCUMENTS

| 3,562,526 | 2/1971 | Lawson | 250/266 |
| 3,911,279 | 10/1975 | Gilland et al. | 250/389 X |
| 3,935,464 | 1/1976 | Zingaro | 250/385.1 X |
| 4,136,282 | 1/1979 | Cox et al. | 250/336.1 |
| 4,259,575 | 3/1981 | LeVert et al. | 250/336.1 |
| 4,447,727 | 5/1984 | Friesenhahn | 250/385.1 X |
| 4,638,499 | 1/1987 | Eberhard et al. | 250/385.1 X |
| 4,804,848 | 2/1989 | Horiba et al. | 250/394 |

FOREIGN PATENT DOCUMENTS

| 3021509 | 6/1980 | Fed. Rep. of Germany | 250/385.1 |
| 3542306 | 6/1987 | Fed. Rep. of Germany | 250/385.1 |
| 0237227 | 7/1986 | German Democratic Rep. | 250/385.1 |
| 2532485 | 2/1970 | U.S.S.R. | 250/389 |
| 2154732 | 9/1985 | United Kingdom | 250/374 |

Primary Examiner—Constantine Hannaher
Assistant Examiner—J. Eisenberg
Attorney, Agent, or Firm—Foley & Lardner, Schwartz, Jeffery, Schwaab, Mack, Blumenthal & Evans

[57] ABSTRACT

A high resolution directional gamma ray detector includes a thin piece of foil, such as tantalum, which reacts with gamma rays incident to the edge of the foil to generate electron/positron pairs. Gamma rays originating from directions other than a direction of interest are shielded from the foil by shielding plates. An opening between the foil by shielding plates. An opening between two collimating plates permits passage of gamma rays originating from a direction of interest and allows gamma rays originating from a direction of interest to react with the foil. The generated electron and positron cause ionization in a plurality of cells. Signals resulting from these ionizations are processed by an electronic computation system through the use of coincidence processing to determine whether the signals are the result of a reaction between the foil and a gamma ray which passed through the collimator opening.

14 Claims, 4 Drawing Sheets

HIGH RESOLUTION DIRECTIONAL GAMMA RAY DETECTOR

BACKGROUND OF THE INVENTION

The present invention relates to gamma ray detectors. More specifically, the present invention is related to light weight directional gamma ray detectors having a high degree of angular resolution, high efficiency, and an ability to discriminate low energy gamma rays.

Conventional directional gamma ray detectors generally employ the use of extended collimators and shielding to channel gamma rays from a predetermined direction to the measuring device of the gamma ray detector. An example of a conventional direction gamma ray detection system is illustrated in U.S. Pat. No. 3,562,526 issued to Lawson. The detection system disclosed in this reference employs a shield having a plurality of passages extending in parallel relationship with one another to collimate incoming gamma rays, and requires a great deal of space and weight due to the extensive use of shielding material and the construction of the collimator. The detection system disclosed in U.S. Pat. No. 3,562,526, therefore, is impractical in the many applications where space or weight is a concern.

Another type of conventional directional gamma ray detectors is illustrated U.S. Pat. No. 4,136,282 issued to Cox et al. The detector disclosed in U.S. Pat. No. 4,136,282 employs a radiator strip contained within a case that is made of an electrical conductor of a high atomic number that is backed by a conducting strip of a low atomic number. In operation, gamma rays incident normal to the broad side of the radiator will pass through the junction of the radiator strip and conducting strip causing electrons to be freed as a result of three processes, the photoelectric effect, the Compton effect and pair production. The electrons produced by the photoelectric effect in the radiator strip and conducting strip are emitted from the radiator strip and collected by the case. The current in the case is measured to determine the magnitude of incident gamma rays.

The above-described detector, while having a degree of directional sensitivity, does not provide a high degree of angular resolution, i.e., an angular resolution on the order of approximately 0.1 radian or less. In addition, the above-described detector does not discriminate low energy gamma rays, that is, gamma rays below 1 MeV. Since environments where a gamma ray detector may be used frequently have a large number of low energy background gamma rays, discrimination of these low energy gamma rays is essential in order to eliminate unwanted detection signals. Other conventional directional gamma detectors, for example as disclosed in U.S. Pat. No. 4,259,575, also suffer from the lack of a high degree of angular resolution. Thus, extensive collimators or shielding are still needed in order to obtain a high degree of angular resolution, thereby adding to the weight and physical size of the detector.

Thus there is a need for a lightweight, compact and highly sensitive directional gamma ray detector which has a high degree of angular resolution and which can function effectively in an environment having a large number of low energy background gamma rays.

SUMMARY OF THE INVENTION

An object of the invention, therefore, is to provide a highly sensitive directional gamma ray detector with a high degree of angular resolution.

Another object of the invention is to provide a directional gamma ray detector which is lightweight, compact and contains a minimum amount of shielding material.

An additional object of the invention to provide a directional gamma ray detector which is insensitive to background gamma rays below 1 MeV.

A still further object of the invention to provide a directional gamma ray detector whose angular resolution may be adjusted.

More specifically, the present invention provides a directional gamma ray detector including a thin piece of foil material which reacts with high energy gamma rays incident to the edge of the foil to generate electron/positron pairs. Gamma rays originating from directions other than a direction of interest are shielded from the foil by a shielding material. The shielding material, however, can be extremely thin and light weight due to the thickness of the foil, i.e., only the thin edge of the foil needs to be shielded as gamma rays incident the broad surface of the foil will pass through the foil with a low probability of generating electron/positron pairs. A collimator is provided with a collimator opening which permits passage of gamma rays originating from a direction of interest. The collimator is also relatively small and light weight due to the width of the foil. The electron and positron that result from the reaction with the foil pass through gas cells and generate signals indicative of their direction. These signals are processed by an electronic computation system to determine whether the signals are the result of a reaction between the foil and a gamma ray which passed through the collimator opening.

BRIEF DESCRIPTION OF THE DRAWINGS

The present invention is described below with reference to the accompanying drawings, where.

DETAILED DESCRIPTION OF THE PREFERRED EMBODIMENTS

Figure 1:
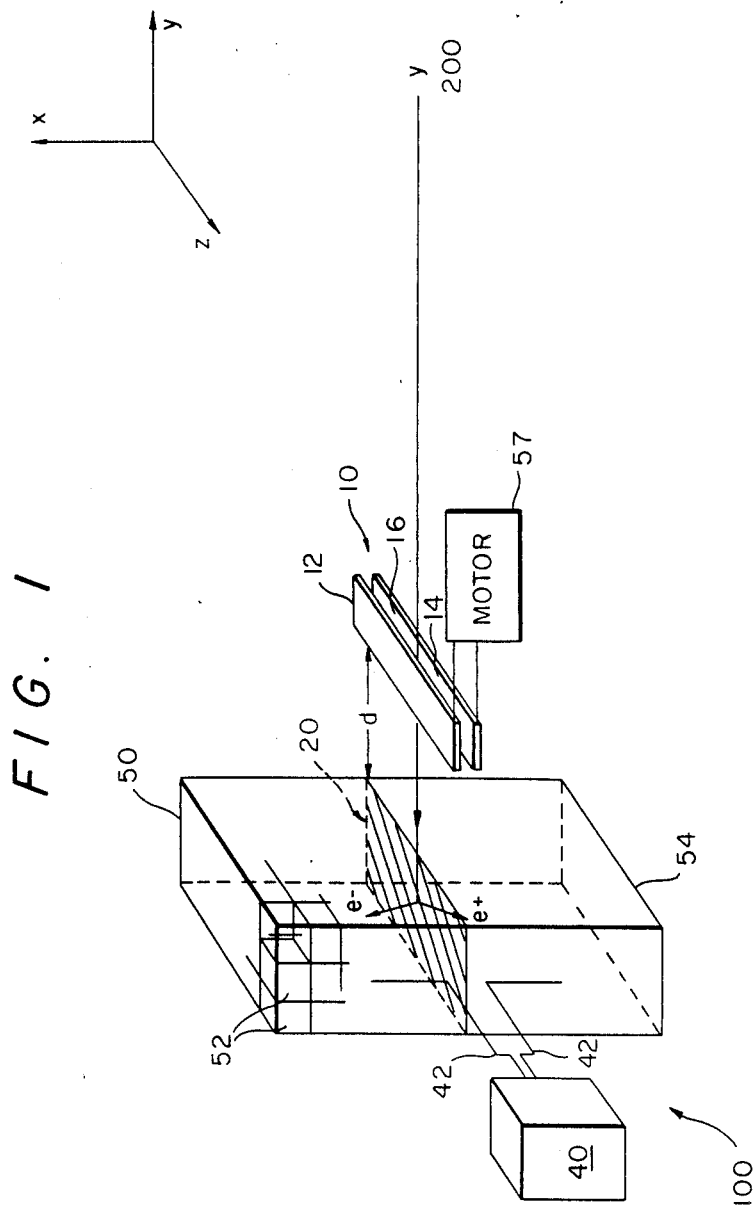
FIG. 1 illustrates a high resolution directional gamma ray detector according to a preferred embodiment of the invention, with shielding removed for clarity.
Figure 2:
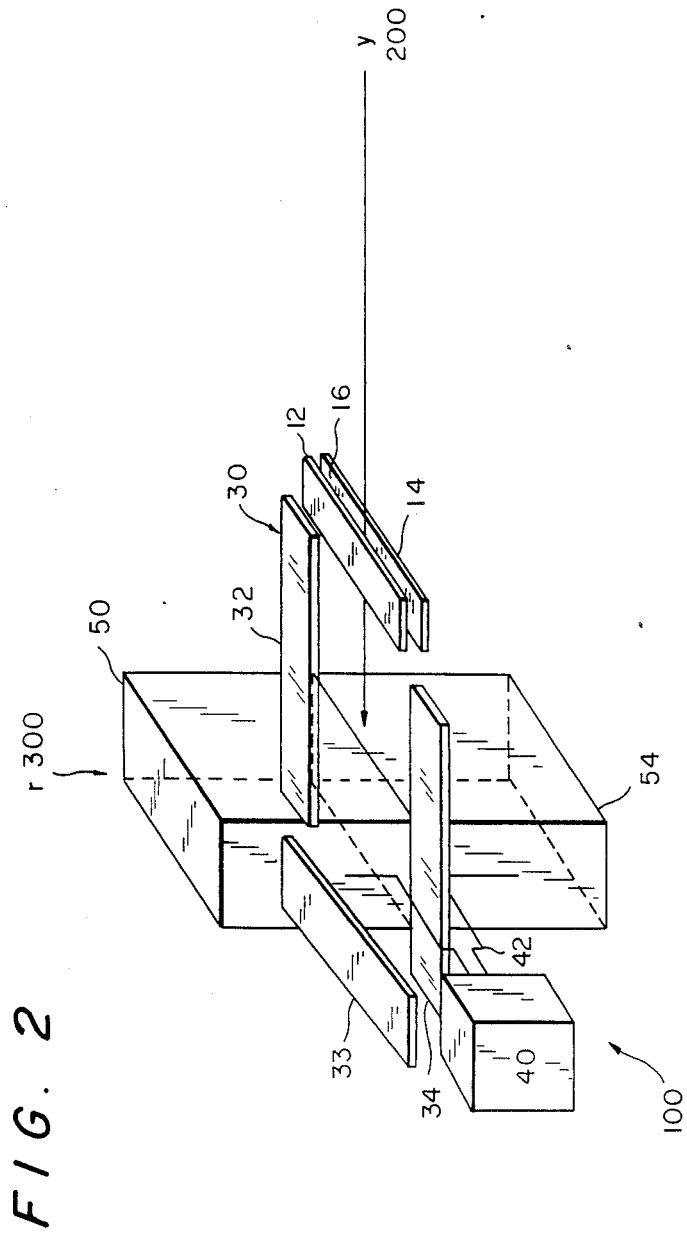
FIG. 2 illustrates the high resolution directional gamma ray detector of FIG. 1 with the shielding included.

FIGS. 1 and 2 illustrate a preferred embodiment of a high resolution directional gamma ray detector 100. Shielding has been removed from FIG. 1 to more clearly illustrate the generation of electron positron pairs in response to incident gamma rays. The high resolution directional gamma ray detector 100 includes a thin piece of foil 20 located between a first multicell gas chamber 50 and a second multicell gas chamber 54. The first multicell gas chamber 50 and the second multicell gas chamber 54 include a plurality of individual gas cells 52 that are electrically connected to an electronic computation system 40 via a plurality of signal lines 42.

A collimator 10 is located in front of the foil 20 and includes collimating plates 12 and which are driven by a motor drive system 57. As shown in FIG. 2, first, second and third shielding plates 32, 33 and 34 are located adjacent to and coplanar with the metal foil.

In operation, a gamma ray originating from a direction of interest 200 passes through collimator 10 and reacts with foil 20. The foil 20 is oriented such that a gamma ray 200, passing through the collimator 10, will have a path through the foil 20 that maximizes the chance of a reaction that will generate an electron/positron pair, i.e., a gamma ray which passes through the collimator 10 will be exposed to a sufficient amount of foil material to make a reaction likely. As illustrated in FIG. 1, gamma rays passing through the collimator 10 preferably strike the edge of the foil 20.

The first collimating plate 12 and the second collimating plate 14 form a collimator opening 16 through which the gamma ray from the direction of interest 200 passes. The first collimating plate 12 and the second collimating plate 14 are parallel to each other, have dimensions of $3 \times 100 \times 0.15$ centimeters and are preferably fabricated from tantalum or tungsten, although other dimensions and materials may be used. Gamma rays which do not originate from a direction lying in the plane of the collimator opening 16 will be attenuated prior to reaching the foil 20 by the first collimating plate 12 and the second collimating plate 14. Thus only an acceptably low number of gamma rays which do not originate from a direction lying in the plane of the collimator opening will have a chance to react with the foil 20. Thus, the collimator 10 provides directional sensitivity to the directional gamma ray detector 100.

The angular sensitivity of the directional gamma ray detector 100 may be varied by varying the distance d between the collimator 10 and the foil 20. For example, motor drive system 51 or other positioning systems may be employed to move the collimator structure to adjust the distance d. If the distance d is decreased, the directional gamma ray detector 100 will detect gamma rays that originate from a wider range of incident angles than if the distance d is increased. An angular resolution of 0.002 radians in the X direction may be obtained.

Figure 3:
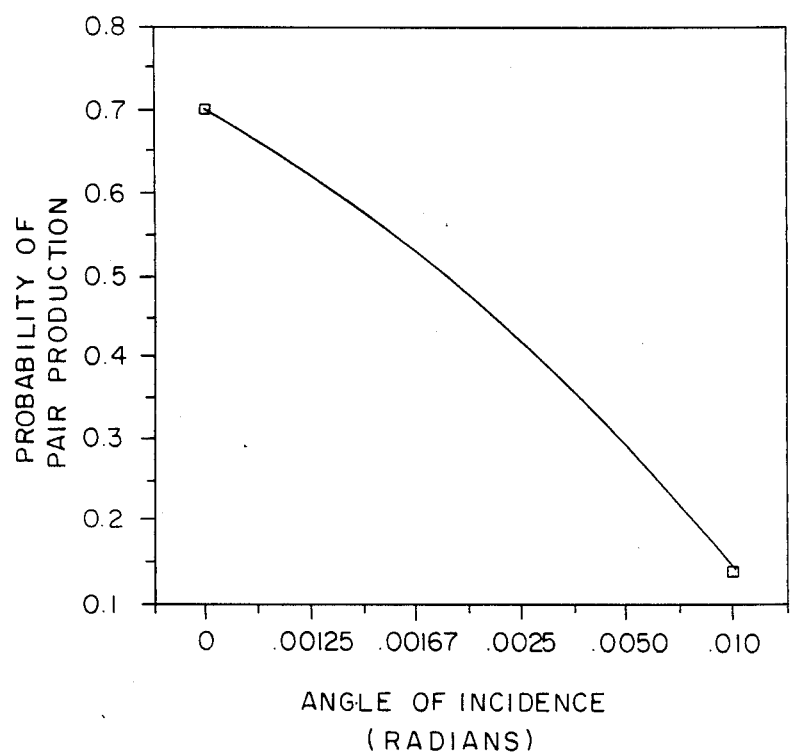
FIG. 3 is a graph of the probability of electron/positron pair production versus the gamma ray angle of incidence.

When the gamma ray 200 reacts with the foil 20 an electron (e−) and a positron (e+) are emitted through the pair production phenomenon. Since momentum must be conserved in the reaction, the electron will be emitted in one direction, the positron will be emitted in another direction, and the paths the emitted electron and the emitted positron will be related to one another by conservation of momentum principles. FIG. 3 illustrates the probability of electron/positron pair production versus gamma ray angle of incidence.

Figure 4:
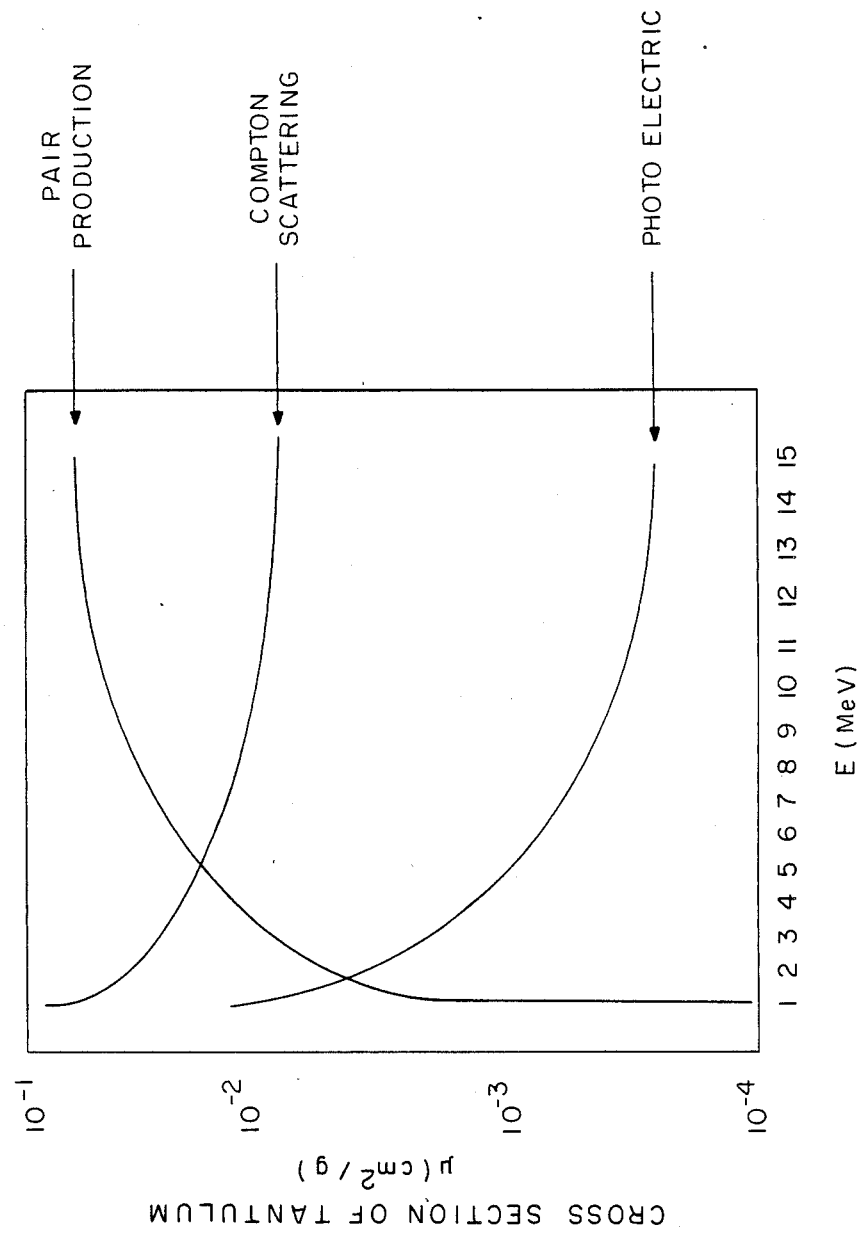
FIG. 4 is a graph of the cross section of a tantalum foil versus gamma ray energy.

In the preferred embodiment the foil 20 has dimensions of $4 \times 100 \times 0.005$ centimeters and is made of tantalum. An advantage of using a material such as tantalum and using electrons and positrons generated as a result of the pair production reaction may be seen from FIG. 4, namely, the pair production cross section of tantalum decreases significantly below 5 MeV and is zero. These small pair production cross sections at low gamma ray energies and the coincidence procedure, to be discussed in further detail below, make the detector insensitive to low energy gamma rays. Since gamma ray detectors are frequently used in environments which have many low energy gamma rays which are of no interest, the use of a foil material and coincidence procedure results in a detector that is insensitive to low energy gamma rays, reduces extraneous reactions and, as will be explained later, reduces unwanted noise.

The use of tantalum makes the directional gamma ray detector 100 sensitive to gamma rays in the 1-30 MeV range. Other foil materials may be used to detect gamma rays up to and above 60 MeV, depending on a user's particular requirements. For example, copper may be employed as the foil 20 to make the directional gamma ray detector 100 sensitive to gamma rays in the 15-60 MeV range.

The shielding plates 32, 33 and 34 shield the foil 20 from gamma rays which are traveling in the plane of the foil 20 and which originate from a direction other than the direction of interest. The first and third shielding plates 32 and 34 preferably have dimensions of $4 \times 15 \times 0.15$ centimeters and can be made of tantalum, tungsten, or any other heavy metal attenuating material. The third shielding plate 33 preferably has dimensions of $4 \times 100 \times 0.15$ centimeters and can be made of the same type of material as shielding plates 32 and 34.

Due to the geometry of the present invention, only gamma rays traveling in the plane of the foil 20 will encounter enough foil material to make a pair production reaction likely. Therefore shielding only has to be provided in the plane of the foil resulting in a substantial overall weight reduction over conventional detectors. It should be noted that it is possible that a gamma ray incident approximately normal to the foil 20, such as gamma ray 300 illustrated in FIG. 2, may react with the foil 20. Reactions due to gamma rays incident approximately normal to the foil 20 will seldom occur since these gamma rays will pass through very little foil material. In addition, as will be discussed below, reactions resulting from gamma rays incident approximately normal to the foil 20, gamma rays incident at other angles not in the direction of interest, and gamma rays originating within the detector due to Compton interaction in the foil or in the multicell gas chambers can be discriminated by electronic signal processing.

The emitted electron and positron are detected in first multicell gas chamber 50 and second multicell gas chamber 54. In the preferred embodiment, each multicell gas chamber 50 and 54 has dimensions of $6 \times 10 \times 100$ centimeters and includes seven hundred fifty gas cells 52. The gas cells 52 each have dimensions of $2 \times 2 \times 2$ centimeters and are filled with argon or other high gain ionization gas. When an electron or a positron passes through a gas cell 52, the gas is ionized and a discharge current is produced. The discharge currents from all of the gas cells 52 are routed to electronic computation system 40 via plurality of signal lines 42.

The electronic computation system 40, which is preprogrammed with possible values of input momentum of a gamma ray passing through the collimator, receives the signals from the gas cells 52, determines the path of the emitted electron and the path of the emitted positron, and employs coincidence processing to determine if a gamma ray from the direction of interest has been received. As previously explained, the path of an incident gamma ray and the paths of the emitted electron and emitted positron are related by conservation of momentum, therefore the path of the electron and the path of the positron indicates whether the electron/positron pair was generated as a result of a reaction between the foil 20 and a gamma ray which passed through the collimator 10, i.e., the paths generated from a gamma ray received from the direction of interest will be mirror images in respect to the plane of the foil.

Coincidence processing also screens out signals resulting from stray ambient electrons and positrons and other particles which may cause ionization in the gas cells 52. The electronic computation system 40 discriminates between gamma rays which pass through the collimator 10 and react with the foil 20, such as gamma ray 200, and gamma rays which do not pass through the collimator 10 but do react with the foil 20, such as gamma ray 300, by determining the paths of the emitted electron and the emitted positron. The electronic computation system 40 also discriminates gamma rays resulting from reactions within the detector.

The foregoing description has been set forth merely to illustrate preferred embodiments of the invention and is not intended to be limiting. Since modification of the described embodiments, incorporating the spirit and substance of the invention may occur to persons skilled in the art, the scope of the invention should be limited solely with respect to the appended claims and equivalents.

What is claimed is:

1. A directional gamma ray detector, comprising:
    a first multicell gas chamber and a second multicell gas chamber, each multicell gas chamber having a plurality of gas cells that generate a signal indicative of an electron or positron passing through the gas cell;
    a reaction foil located between and separating the first and second multicell gas chambers, wherein the foil reacts with gamma rays incident to an edge of the foil to produce electron/positron pairs;
    a shield located adjacent to at least one edge of the foil and having a thickness sufficient to prevent gamma rays originating from a direction other than the direction of interest from reacting with the foil within a predetermined acceptable value;
    a collimator having a collimator opening which permits passage of gamma rays originating from a direction of interest; and
    an electronic computation system coupled to the first and second multicell gas chambers to receive the signals generated from the gas cells.

2. A directional gamma ray detector as set forth in claim 1, wherein the electronic computation system performs coincidence processing to determine whether the signals generated are the result of a pair production reaction between the foil and a gamma ray which passed through the collimator opening.

3. A directional gamma ray detector as set forth in claim 2, wherein the electronic computation system performs coincidence processing to reject Compton interactions in the reaction foil, the first multicell gas chamber, and the second multicell gas chamber.

4. A directional gamma ray detector as set forth in claim 2, wherein the foil is in the shape of a thin plate, the two largest dimensions of the foil and the collimator opening lie in a first plane.

5. A directional gamma ray detector as set forth in claim 4, wherein the collimator includes two collimating plates, each collimating plate being parallel to the first plane and the shield includes at least two shielding plates, each shielding plate lying in the first plane.

6. A directional gamma ray detector as set forth in claim 4, wherein;
    the collimator includes two collimating plates, each collimating plate being parallel to the first plane;
    the shield consists of two shielding plates, each shielding plate lying in the first plane; and the thickness of each of the shielding plates in the direction perpendicular to the first plane is at least six times that of the foil.

7. A directional gamma ray detector as set forth in claim 5, further comprising:
    a drive means, connected to the two collimating plates for varying a distance between the collimator opening and the foil.

8. A directional gamma ray detector as set forth in claim 7, wherein the foil is tantalum.

9. A directional gamma ray detector as set forth in claim 7, wherein the foil is copper.

10. A directional gamma ray detector as set forth in claim 7, wherein the collimator is tantalum.

11. A directional gamma ray detector as set forth in claim 7, wherein the collimator is tungsten.

12. A directional gamma ray detector as set forth in claim 7, wherein:
    the dimensions of the foil are approximately $4 \times 100 \times 0.005$ centimeters;
    the dimensions of each collimating plate are approximately $3 \times 100 \times 0.15$ centimeters; and
    the shield includes first and second shielding plates having dimensions of approximately $4 \times 15 \times 0.15$ centimeters; and
    the shield includes a third shielding plate having dimensions of approximately $4 \times 100 \times 0.15$ centimeters.

13. A directional gamma ray detector as set forth in claim 7, wherein the number of gas cells in each multicell chamber is approximately seven hundred fifty and each gas cell is approximately $2 \times 2 \times 2$ centimeters.

14. A method of detecting gamma rays originating from a direction of interest, comprising the steps of:
    passing gamma rays originating from a direction of interest through a collimator opening;
    shielding gamma rays originating from directions other than the direction of interest by use of a shield;
    generating an electron and a positron by reacting a gamma ray from a direction of interest with a piece of foil;
    sensing electrons and positrons in three dimensional position sensitive ionization chambers;
    determining the path of the sensed electrons and the path of the sensed positrons; and
    determining whether the path of the sensed electrons and the path of the sensed positrons correspond to a gamma ray which has passed through the collimator opening.

* * * * *